United States Patent [19]

Wadsworth et al.

[11] 4,446,223

[45] May 1, 1984

[54] RECORDING AND INFORMATION RECORD ELEMENTS COMPRISING OXOINDOLIZINE AND OXOINDOLIZINIUM DYES

[75] Inventors: Donald H. Wadsworth; Harold T. Thomas, both of Rochester; George L. Fletcher, Pittsford; Charles H. Weidner, Rochester, all of N.Y.

[73] Assignee: Eastman Kodak Company, Rochester, N.Y.

[21] Appl. No.: 391,769

[22] Filed: Jun. 24, 1982

[51] Int. Cl.³ ............................................. G03C 1/52
[52] U.S. Cl. ................................... 430/338; 430/945; 346/135.1; 346/76 L; 346/76 R
[58] Field of Search ............... 430/338, 945, 339, 340; 346/135.1, 76 L, 76 R; 358/297

[56] References Cited

U.S. PATENT DOCUMENTS

| | | | |
|---|---|---|---|
| 3,846,131 | 11/1974 | Lohmann | 430/344 |
| 4,097,895 | 6/1978 | Spong | 358/128 |
| 4,368,247 | 1/1983 | Fletcher et al. | 430/336 |

OTHER PUBLICATIONS

Research Disclosure, Item 19412, vol. 194, Jun. 1980, p. 2, lines 19–22.
Research Disclosure, Item 17522, vol. 175, Nov. 1978, p. 3, lines 14–17.

*Primary Examiner*—Won H. Louie, Jr.
*Attorney, Agent, or Firm*—John R. Everett

[57] ABSTRACT

Oxoindolizine and oxoindolizinium dyes are useful as radiation absorptive materials in recording elements.

5 Claims, No Drawings

RECORDING AND INFORMATION RECORD ELEMENTS COMPRISING OXOINDOLIZINE AND OXOINDOLIZINIUM DYES

FIELD OF THE INVENTION

The present invention relates to optical recording and information elements.

DESCRIPTION RELATIVE TO THE PRIOR ART

Elements for recording information by thermally altering the physical structure of a material are known. One such element comprises a layer of a solvent-coated plastic material coated on a support. The plastic material can be thermally deformed by a laser beam so that some of the plastic material is displaced in the area illuminated by the beam. This deformation pattern retains its shape after the laser beam is removed. The resulting deformation pattern can be read by projecting the pattern onto a viewing screen.

More recently, elements and means have been provided for rapidly recording large amounts of digital information in a small area. These elements provide a method for recording video information which can be read back with a high carrier-to-noise ratio (CNR). These elements employ a thin recording layer of a certain metallic or organic material which is vacuum-deposited on a support. Recording is accomplished by a beam of high-energy density radiation, such as a laser beam. Typically, the laser beam is focused onto the surface of the recording layer of the element. The recording layer is such that it absorbs energy from the laser beam so that small portions of the layer burn, evaporate or are otherwise displaced from these portions. This technique is usually referred to as "ablative recording". Normally, there is continuous motion between the laser and the layer so that, as the laser is pulsed or modulated, discrete pits or holes of varying sizes are created in the layer. The sizes and spacing of these holes constitute the encoded information. One element of this type is commonly referred to in the art as a video disc.

Optical recording discs of the ablative type can be read back using a laser beam similar to the one used to record the element. In conventional ablative video discs, the reading beam must also be significantly absorbed by the recording layer. A continuous reading beam is focused on the recording layer and the difference in optical density between pitted and unpitted areas is detected by a photo-detector. The recording layer must absorb significantly less energy from the reading beam than it absorbs from the writing beam if physical damage to the recording is to be avoided. This is usually accomplished by using a reading beam of much lesser power than the writing beam.

In *Research Disclosure,* Vol. 194, Item 19412, June 1980, published by Industrial Opportunities Ltd., Homewell, Havant, Hampshire, PO9, 1EF, UK, an element is disclosed for recording information by thermal deformation. The recording element comprises a support and a layer of a radiant energy-absorptive dye in a thermally deformable binder. Upon exposure to a pulsed beam of high intensity radiant energy, deformation comprising a depression surrounded by a ridge are formed, thus allowing recording with a modulated beam and playback by reflection and/or refraction. Laser beam recording upon such an element has heretofore been accomplished with an argon-ion laser which emits at 488 nm. A pulsed beam is obtained from the continuous argon-ion laser beam by modulating the beam with an acousto-optic or electro-optic modulator. Those modulators have low efficiency and the system thus requires a high-power laser.

Currently, however, there are diode lasers available which are more suitable for home-use because their output can be modulated directly. These can function as well as much more powerful continuous gas lasers for optical recording and readback. They need no expensive acousto-optic or electro-optic modulators and are becoming available at greatly reduced prices. The earlier constructed diode lasers emitted at about 800–900 nm and newer models emit between 750–850 nm. There is a need for soluble, solvent-coatable materials absorbing between 750–900 nm, preferably 750–850 nm, which are suitable for use in recording elements of the type described in *Research Disclosure,* Vol. 175, Item 17522, November 1978, published by Industrial Opportunities Ltd., Homewell, Havant, Hampshire, PO9, 1EF, UK, designed for recording and playback with a low-power diode laser.

SUMMARY OF THE INVENTION

The present invention provides optical recording and information record elements comprising a support having coated thereon a layer of an amorphous composition comprising a binder and a dye selected from the group consisting of oxoindolizine and oxoindolizinium dyes. Many of the dyes absorb in the 750–900 nm range of the spectrum. The recording elements comprising such dyes are useful in optical recording methods employing diode recording and readback laser devices.

Examples of useful classes of dyes include methyleneoxoindolizine, (4-oxoarylidene)oxoindolizine, bisoxoindolizine, bis(oxoindolizinyl)ethylene, (2- and 4-aminoarylidene)polymethineoxoindolizine and pyridiniumoxoindolizine dyes. The oxoindolizine and oxoindolizinium dyes according to the invention are in their keto or enol form. These dyes are optionally in their various isomeric and tautomeric forms.

The present invention also provides a method of making a recording element comprising the steps:
1. applying to a support a coating composition comprising a radiation absorptive dye and a compatible binder and
2. drying the composition to form an amorphous layer; characterized in that the dye is selected from the group consisting of oxoindolizine and oxoindolizinium dyes.

DESCRIPTION OF THE PREFERRED EMBODIMENTS

Preferred recording and information record elements comprise recording layers which absorb in the 750–900 nm region of the spectrum. The layers comprise oxoindolizine and oxoindolizinium dyes which in their keto form have the structures:

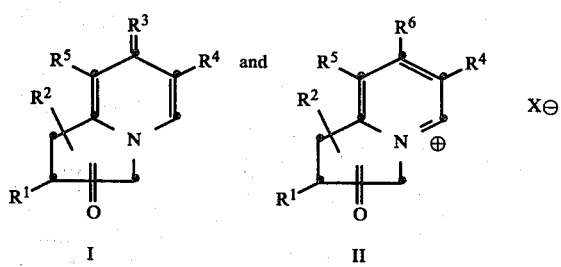

wherein

R¹ and R² are individually selected from the group consisting of alkyl containing 1 to 18 carbon atoms including straight or branched-chain alkyl, preferably containing 1 to 10 carbon atoms, such as methyl, ethyl, propyl, isobutyl and decyl;

aryl containing 6 to 20 carbon atoms, such as phenyl, tolyl, xylyl, methoxyphenyl, dimethoxyphenyl, 4-t-butylphenyl, anisyl, naphthyl and methoxynaphthyl and polystyryl having appended groups selected from the group consisting of indolizine and indolizinium groups and combinations thereof;

R³ is a divalent group which, with the structure I nucleus completes an organic chromophore;

R⁴ and R⁵ are individually hydrogen or a substituent that does not adversely affect desired dye properties, such as chlorine, bromine, alkyl containing 1 to 18 carbon atoms, such as, methyl, ethyl and dodecyl; cyano; acyl containing 2 to 18 carbon atoms, such as acetyl, propionyl, 2-ethylhexanoyl and stearoyl; carboalkoxy containing 1 to 18 carbon atoms, such as carbomethoxy, carboethoxy and carbobutoxy; aminocarbonyl, such as unsubstituted aminocarbonyl, methylaminocarbonyl, dimethylaminocarbonyl and ethylaminocarbonyl; acyloxy containing 2 to 18 carbon atoms, such as acetoxy, propionoxy, butyroxy and lauroyloxy;

R⁶ is a monovalent group which, with the oxoindolizinium nucleus, completes an organic chromophore; and X⊖ is an anion, such as, methanesulfonate, trifluoromethanesulfonate, para-toluenesulfonate, bromide, chloride, iodide, sulfinate, perchlorate and tetrafluoroborate.

Useful R³ and R⁶ groups are, for example:
a. substituted or unsubstituted heterocyclyl or heterocyclylidene groups optionally appended through methine and polymethine groups, such as
 i. indolizine and indolizinium groups illustrated by structures (I) and (II) appended directly as the respective R³ and R⁶ groups or appended through a substituted or unsubstituted methine or polymethine chain, such as containing 1 to 6 methine groups,
 ii. pyridylidene,
 iii. pyranyl,
 iv. pyranylidene,
 v. thiopyranyl,
 vi. thiopyranylidene, and
 vii. julolidyl; including the onium salts of such heterocyclyl and heterocyclylidene groups, such as the immonium, oxonium and sulfonium salts; and the acid addition salt derivatives of such heterocyclyl and heterocyclylidene groups;

b. substituted and unsubstituted aminoarylmethine and hydroxyarylmethine, including their tautomers, such as represented by the formula:

(Z)(A)(D)

wherein

Z is a methine or polymethine group, containing 1 to 6 methine groups;

A is a substituted or unsubstituted aromatic group, such as arylene containing 6 to 20 carbon atoms, for example, phenylene, cyclohexadientetrayl, naphthylene, and 1H,4H-naphthalene-1,4-tetrayl; and D is $-OR^{11}$, $-NR^{12}R^{13}$, $=O$, or $=NR^{14}$ wherein R¹¹ is a monovalent cation, preferably hydrogen;

R¹² and R¹³ are independently selected from hydrogen, substituted or unsubstituted alkyl, such as alkyl containing 1 to 20 carbon atoms, alkenyl, such as alkenyl containing 2 to 20 carbon atoms, and aryl, such as aryl containing 6 to 20 carbon atoms, including phenyl and tolyl; or NR¹²R¹³ taken together with (A) form a polycyclic heterocyclic group, such as a 9-julolidyl group;

R¹⁴ is alkyl, such as alkyl containing 1 to 20 carbon atoms or aryl such as aryl containing 6 to 20 carbon atoms;

c. a methylene group substituted with at least one, preferably two electronegative groups, such as acyl, cyano, aryl, alkoxycarbonyl, and aminocarbonyl groups; and d. a formyl group.

For high quality recordings having a carrier-to-noise ratio of at least 40 decibel, it is also preferred that the recording layer has an "absorption factor" of at least 20. The "absorption factor" is defined as the product of the weight fraction of dye included in the dye-binder composition and the molar extinction coefficient of dye at the maximum wavelength of absorption of the dye ($\epsilon\lambda_{max}$), divided by the molecular weight of the dye (MW). The absorption factor is recited in terms of units of liter per gram-centimeter.

DETAILED DESCRIPTION OF THE INVENTION

The preparation of oxoindolizine and oxoindolizinium dyes is described in commonly assigned U.S. Ser. No. 278,022 entitled "Oxoindolizine And Oxoindolizinium Dyes And Processes For Their Preparation", filed June 29, 1981 by Fletcher et al, the description of which is incorporated herein by reference.

In general, the oxoindolizine and oxoindolizinium dyes are prepared by
1. reaction of a cyclopropenone compound with a pyridine compound, or
2. reaction of a cyclopropenone compound with a pyridine compound and then with a color-forming coupler, or
3. a condensation reaction. The term "condensation reaction" used herein means a dehydration involving, for example, an active methylene coupler and a carbonyl group.

The pyridine compound does not include a pyridine which contains a substituent in the 2-position or 6-position on the pyridine ring. It was found in reactions (1), (2) and (3) that the pyridine compound does not form an oxoindolizine or oxoindolizinium dye when the pyridine compound contains a substituent in the 2-position or 6-position on the pyridine ring, that is in the position on the ring next to the ring nitrogen atom.

Optimum methods for preparation of the dyes will of course vary, depending upon the desired dye, particular starting material, such as the particular cyclopropenone, particular color-forming coupler, active methylene coupler, particular pyridine compound, solvents, reaction temperature, concentration of reactants, catalysts present and desired end use of the dye. The cyclopropenone and pyridine compounds are generally mixed in about stoichiometric concentrations; however, it is often useful to mix the reactants with an excess of the pyridine compound to provide better yields or different isomers.

A reaction medium which comprises a solvent for the reactants is most useful. Useful solvents include pyridine, chlorinated hydrocarbons, such as methylene chloride and chlorobenzene, toluene, dioxane, and tetrahydrofuran. Pyridine and some pyridine related solvents, such as 4-picoline, are especially useful in producing isomers. The reactants are generally mixed at about room temperature (about 19° C.) and then heated to reaction temperature, such as a temperature within the range of about 50° to about 150° C. The optimum reaction temperature will be influenced by the choice of solvent, the particular reactants, the desired dye, and other described factors.

When a dye according to the invention is formed by the reaction of a cyclopropenone with a pyridine compound and a color-forming coupler, it is generally preferred that the reaction be carried out in chemical association with an appropriate oxidant, such as elemental iodine, copper bromide, copper acetate, benzoyl peroxide or copper acetylacetonate. The concentration of oxidant that is useful will vary, depending upon the particular reactants, processing conditions, desired dye, and reaction medium. An oxidant is especially useful in the reaction of a cyclopropenone with a pyridine compound and an active methylene coupler.

In the process for preparing an indolizinone dye by reaction of a pyridine compound with a cyclopropenone and then an active methylene, the reaction is carried out in a suitable solvent, such as a solvent comprising methylene chloride, chlorobenzene or pyridine. The reactants are mixed in a concentration which provides a desired reaction mixture. The reaction temperature is generally within the range of about 0° C. to reflux temperature, which is about 40° C. to about 150° C. The proportion of pyridine compound based on the cyclopropenone compound is generally within the range of about an equimolar concentration of pyridine compound to a large excess. The proportion of active methylene coupler is generally within the range of equimolar concentration of the active methylene coupler to a large excess. The reaction generally is carried out at a temperature of about 50° C. to about 150° C. The reaction is preferably carried out in reactive association with an oxidant, such as metallic iodine, copper ions or copper ions and oxygen, with metallic iodine being preferred. The concentration of oxidant is generally a stoichiometric concentration based on the concentration of coupler. An excess of iodine oxidant is useful to provide increased yield.

In preparing an oxoindolizine dye by the reaction of a pyridine compound with a cyclopropenone compound, the condensation is generally carried out in a solvent. The concentration of reactants is generally about stoichiometric. However, an excess of pyridine or picoline is often useful. The reaction temperature is generally within the range of 0° C. to about 95° C. The reaction is preferably carried out in chemical association with an oxidant, such as copper ions or air.

Examples of useful oxoindolizine and oxoindolizinium dyes are presented in Table I.

TABLE 1

| Dye No. | |
|---|---|
| 1 | 1,2-diphenyl-7-(2-hydroxy-4-oxo-2,5-cyclohexadien-1-ylidene)-3H,7H-indolizin-3-one |
| 2 | 1,2-diphenyl-7-(4-oxo-4H-naphthylidene)-3H,7H-indolizin-3-one |
| 3 | 1,2-diphenyl-6-methyl-7-(4-oxo-2,5-cyclohexadien-1-ylidene)-3H,7H-indolizin-3-one |
| 4 | 2,3-diphenyl-6-formyl-7-(4-oxo-2,5-cyclohexadien-1-ylidene)-1H,7H-indolizin-1-one |
| 5 | 6-diethylaminocarbonyl-2,3-diphenyl-(4-oxo-2,5-cyclohexadien-1-ylidene)-1H,7H-indolizin-1-one |
| 6 | 1,2-diphenyl-6-ethyl-7-(4-oxo-2,5-cyclohexadien-1-ylidene)-3H,7H-indolizin-3-one |
| 7 | 6-cyanomethyl-1,2-diphenyl-7-(4-oxo-2,5-cyclohexadien-1-ylidene)-3H,7H-indolizin-3-one |
| 8 | 1,2-diphenyl-6-(3-hydroxypropyl)-7-(4-oxo-2,5-cyclohexadien-1-ylidene)-3H,7H-indolizin-3-one |
| 9 | 1,2-diphenyl-6-ethoxycarbonylmethyl-7-(4-oxo-2,5-cyclohexadien-1-ylidene)-3H,7H-indolizin-3-one |
| 10 | 6,8-dimethyl-1,2-diphenyl-7-(4-oxo-2,5-cyclohexadien-1-ylidene)-3H,7H-indolizin-3-one |
| 11 | 2,3-diphenyl-6-methylaminocarbonyl-7-(4-oxo-2,5-cyclohexadien-1-ylidene)-1H,7H-indolizin-1-one |
| 12 | 2,3-diphenyl-6-methoxycarbonyl-7-(4-oxo-2,5-cyclohexadien-1-ylidene)-1H,7H-indolizin-1-one |
| 13 | 2,3-diphenyl-6-[2-methyl-2-(3-pyridyl)-propionyl-7-(4-oxo-2,5-cyclohexadien-1-ylidene)-1H,7H-indolizin-1-one |
| 14 | 1,2-bis[2,3-diphenyl-7-(4-oxo-2,5-cyclohexadien-1-ylidene)-1H,7H-indolizin-1-on-6-yl]-3-methyl-1-oxobutane |
| 15 | 6-acetyl-2,3-diphenyl-7-(4-oxo-2,5-cyclohexadien-1-ylidene)-1H,7H-indolizin-1-one |
| 16 | 6-benzyl-1,2-diphenyl-7-(4-oxo-2,5-cyclohexadien-1-ylidene)-3H,7H-indolizin-3-one |
| 17 | 6-chloro-1,2-diphenyl-7-(4-oxo-2,5-cyclohexadien-1-ylidene)-3H,7H-indolizin-3-one |
| 18 | 6-cyano-2,3-diphenyl-7-(4-oxo-2,5-cyclohexadien-1-ylidene)-1H,7H-indolizin-1-one |
| 19 | 6-(4-azastyryl)-1,2-diphenyl-7-(4-oxo-2,5-cyclohexadien-1-ylidene)-3H,7H-indolizin-3-one |
| 20 | 2,3-diphenyl-7-(2-hydroxy-4-oxo-3-pivalamido-2,5-cyclohexadien-1-ylidene)-1H,7H-indolizin-1-one |
| 21 | 6-(4-azastyryl)-7-[3-(4-tert-butylbenzamido)-2-hydroxy-4-oxo-2,5-cyclohexadien-1-ylidene]-1,2-diphenyl-3H,7H-indolizin-3-one |
| 22 | 7-[3-(4-tert-butylbenzamido)-2-hydroxy-4-oxo-2,5-cyclohexadien-1-ylidene]-1,2-diphenyl-6-(3-hydroxypropyl)-3H,7H-indolizin-3-one |
| 23 | 7-[3-(4-tert-butylbenzamido)-2-hydroxy-4-oxo-2,5-cyclohexadien-1-ylidene]-6-carbomethoxy-2,3-diphenyl-1H,7H-indolizin-1-one |
| 24 | 7-[3-(4-tert-butylbenzamido)-2-hydroxy-4-oxo-2,5-cyclohexadien-1-ylidene]-2,3-diphenyl-6-methylcarbamyol-1H,7H-indolizin-1-one |
| 25 | 7-[3-(4-tert-butylbenzamido)-2-hydroxy-4-oxo-2,5-cyclohexadien-1-ylidene]-1,2-diphenyl-6-methyl-3H,7H-indolizin-3-one |
| 26 | 7-[3-(4-tert-butylbenzamido)-2-hydroxy-4-oxo-2,5-cyclohexadien-1-ylidene]-6,8-dimethyl-1,2-diphenyl-3H,7H-indolizin-3-one |
| 27 | 7-[3-(4-tert-butylbenzamido)-2-hydroxy-4- |

TABLE 1-continued

| Dye No. | |
|---|---|
| | oxo-2,5-cyclohexadien-1-ylidene]-6-diethylcarbamoyl-2,3-diphenyl-1H,7H-indolizin-1-one |
| 28 | 6-benzyl-7-[3-(4-tert-butylbenzamido)-2-hydroxy-4-oxo-2,5-cyclohexadien-1-ylidene]-1,2-diphenyl-3H,7H-indolizin-3-one |
| 29 | 1,2-bis-{7-[3-(4-tert-butylbenzamido)-2-hydroxy-4-oxo-2,5-cyclohexadien-1-ylidene]-2,3-diphenyl-1H,7H-indolizin-1-on-6-yl}-2-methyl-1-oxo-propane |
| 30 | 2,3-diphenyl-7-[3-(4-tert-butylbenzamido)-2-hydroxy-4-oxo-2,5-cyclohexadien-1-ylidene]-1H,7H-indolizin-1-one |
| 31 | 7-(3,5-di-tert-butyl-4-oxo-2,5-cyclohexadien-1-ylidene)-2,3-di-(4-methoxyphenyl)-1H,7H-indolizin-1-one |
| 32 | 7-(3,5-di-tert-butyl-4-oxo-2,5-cyclohexadien-1-ylidene)-2,3-di-n-propyl-1H,7H-indolizin-1-one |
| 33 | 7-(2-N,N—diethylamino-1-ethenyl)-2,3-di-(4-methoxyphenyl)-1-oxo-1H-indolizinium fluoborate |
| 34 | 7-(2-N,N—diethylamino-1-ethenyl)-1,2-diphenyl-3-oxo-3H-indolizinium iodide |
| 35 | 2,3-di-(4-methoxyphenyl)-7-dimethylamino-1-oxo-1H-indolizinium iodide |
| 36 | 7-(diacetylmethylidene)-1,2-diphenyl-3H,7H-indolizin-3-one |
| 37 | 7-(dibenzoylmethylidene)-2,3-diphenyl-1H,7H-indolizin-1-one |
| 38 | 7-(anilinocarbonylbenzoylmethylidene)-2,3-diphenyl-1H,7H-indolizin-1-one |
| 39 | 6-cyano-7-(diacetylmethylidene)-2,3-diphenyl-1H,7H-indolizin-1-one |
| 40 | 7-(dicyanomethylidene)-2,3-diphenyl-1H,7H-indolizin-1-one |
| 41 | 7-(1-cyano-1-phenylmethylidene)-1,2-diphenyl-3H,7H-indolizin-3-one |
| 42 | 7-(1-aminocarbonyl-1-phenylmethylidene)-2,3-diphenyl-1H,7H-indolizin-1-one |
| 43 | 7-(dicarboethoxymethylidene)-2,3-diphenyl-1H,7H-indolizin-1-one |
| 44 | 2,3-diphenyl-7-(2,2-dimethyl-4,6-dioxo-1,3-dioxan-4-ylidene)-1H,7H-indolizin-1-one |
| 45 | 2,3-diphenyl-7-[(2,6-diphenyl-4-pyranylidene)methyl]-1-oxo-1H-indolizinium perchlorate |
| 46 | 2,3-diphenyl-7-[(2,3-diphenyl-1H,7H-indolizin-1-on-7-ylidene)methyl]-1-oxo-1H-indolizinium trifluoromethanesulfonate |
| 47 | 2,3-diphenyl-7-[(2,6-diphenyl-4-thiopyranylidene)methyl]-1-oxo-1H-indolizinium trifluoromethanesulfonate |
| 48 | 1,2-bis[(1,2-diphenyl-3H,7H-indolizin-3-on-7-ylidene)]ethane |
| 49 | 1,4-bis(1,2-diphenyl-3H,7H-indolizin-3-on-7-ylidene)-2,5-cyclohexadiene |
| 50 | 1,4-bis(1,2-diphenyl-3H,7H-indolizin-3-on-7-ylidene)-1H,4H-naphthalene |
| 51 | 7,7'-bis(2,3-di-n-propyl-1H,7H)-indolizin-1-on-7-ylidene) |
| 52 | 7,7'-bis(2,3-pentamethylene-1H,7H-indolizin-1-on-7-ylidene) |
| 53 | 1,2-bis-[2,3-di-(4-methoxyphenyl)-1H,7H-indolizin-1-ol-7-ylidene]ethane |
| 54 | N—benzyl-4-[2,3-di(4-methoxyphenyl)indolizin-1-ol-7-yl]pyridinium bromide |
| 55 | 7-[4-(N—benzylpyridylidene)]-2,3-diphenyl-1-hydroxyindolizinium chloride |
| 56 | 7-[4-(N—benzylpyridylidene)]-2,3-diphenyl-1H,7H-indolizin-1-one |
| 57 | 7-[2-(4-N,N—dimethylaminophenyl)ethenyl]-2,3-diphenyl-1-oxo-1H-indolizinium fluoborate |
| 58 | 2,3-diphenyl-7-[2-(9-julolidyl)ethenyl]-1-oxo-1H-indolizinium trifluoromethanesulfonate |
| 59 | 2,3-diphenyl-7-[3-(2,6-diphenyl-4H-pyran-4-ylidene)-1-propenyl]-1-oxo-1H-indolizinium perchlorate |
| 60 | 7-[2-(4-N,N—dimethylamino-1-naphthyl)ethenyl]-2,3-diphenyl-1-oxo-1H-indolizinium fluoroborate |
| 61 | 7-[4-(4-dimethylaminophenyl)-1-butadienyl]-1,2-diphenyl-3-oxo-3H-indolizinium trifluoromethanesulfonate |
| 62 | 1-(3,5-di-tert-butyl-4-oxo-2,5-cyclohexadien-1-ylidene)-2-(2,3-diphenyl-1H,7H-indolizin-1-on-7-ylidene)ethane |
| 63 | 2,3-diphenyl-7-[2-(4-nitrophenyl)-1-ethenyl]-1H-indolizin-1-ol, sodium salt |
| 64 | 2,3-diphenyl-7-[2-(2,6-diphenyl-4H-pyran-4-ylidene)-1-ethylidene]-1-hydroxyindolizinium perchlorate |
| 65 | 2,3-diphenyl-7-[2-(2,6-diphenyl-4H-pyran-4-ylidene)-1-ethylidene]-1-acetoxyindolizinium perchlorate |
| 66 | 7-(2,2-diacetyl-1-ethenyl)-2,3-diphenylindolizin-1-ol, sodium salt |
| 67 | 2,3-diphenyl-6-[2-(4-nitrophenyl)-1-ethenyl]-1-indolizinol |
| 68 | 1-(2,3-diphenyl-1H,7H-indolizin-1-on-7-ylidene)-2-(2,6-diphenyl-4H-pyran-4-ylidene)ethane |
| 69 | 7-(3,3-diacetyl-2-propen-1-ylidene)-2,3-diphenyl-1H,7H-indolizin-1-one |
| 70 | 7-[1-cyano-2-(4-dimethylaminophenyl)-1-ethenyl]-1,2-diphenyl-3-oxo-3H-indolizinium trifluoromethanesulfonate |
| 71 | 1,2-di-tert-butylphenyl-7-[4-(4-dimethylaminophenyl)-1-(1,3-butadienyl)]-3-oxo-3H-indolizinium trifluoromethanesulfonate |
| 72 | 2,3-diphenyl-7-[4-(2,6-diphenyl-4H-pyran-4-ylidene)-1-(2-butenyl)]-1-oxo-1H-indolizinium trifluoromethanesulfonate |
| 73 | 2,3-diphenyl-7-[2-(9-julolidyl)-1-ethenyl]-1-oxo-1H-indolizinium trifluoromethanesulfonate |
| 74 | 2,3-di(2,4,6-trimethylphenyl)-7-[2-(9-julolidyl)-1-ethenyl]-1-oxo-1H-indolizinium trifluoromethanesulfonate |
| 75 | 2,3-di(4-tert-butylphenyl)-7-[2-(9-julolidyl)-1-ethenyl]-1-oxo-1H-indolizonium trifluoromethanesulfonate |
| 76 | 2,3-di(2-methyl-5-isopropylphenyl)-7-[2-(9-julolidyl)-1-ethenyl]-1-oxo-1H-indolizinium trifluoromethanesulfonate |
| 77 | 2,3,-diphenyl-7-[2-(1,2-dimethyl-1,2,3,4-tetrahydro-6-quinolinyl)-1-ethenyl]-1-oxo-1H-indolizinium trifluoromethanesulfonate |
| 78 | 2,3-di(2,4,6-trimethylphenyl)-7-[2-(1,2-dimethyl-1,2,3,4-tetrahydro-6-quinolinyl)-1-ethenyl]-1-oxo-1H-indolizonium trifluoromethanesulfonate |
| 79 | 2,3-diphenyl-7-(1-oxo-2-naphthylidene)-1-oxo-1H,7H-indolizine |
| 80 | 2,3-di(2,4,6-trimethylphenyl)-7-(1-oxo-2-naphthylidene)-1-oxo-1H,7H-indolizine |
| 81 | 2,3-diphenyl-7-(1-oxo-4-methyl-2-naphthylidene)-1-oxo-1H,7H-indolizine |
| 82 | 2,3-di(2,5-dimethoxyphenyl)-7-[2-(1,2-dimethyl-1,2,3,4-tetrahydro-6-quinolinyl)-1-ethenyl]-1-oxo-1H-indolizinium trifluoromethanesulfonate |
| 83 | 2,3-di(2,5-dimethoxyphenyl)-6-methyl-7-[2-(1,2-dimethyl-1,2,3,4-tetrahydro-6-quinolinyl)-1-ethenyl]-1-oxo-1H-indolizinium trifluoromethanesulfonate |
| 84 | 2,3-di(2,5-dimethoxyphenyl)-8-methyl-7-[2-(1,2-dimethyl-1,2,3,4-tetrahydro-6-quinolinyl)-1-ethenyl]-1-oxo-1H-indolizinium trifluoromethanesulfonate |
| 85 | 2,3-di(2,5-dimethoxy-4-isopropylphenyl)-7-[2-(1,2-dimethyl-1,2,3,4-tetrahydro-6-quinolinyl)-1-ethenyl]-1-oxo-1H-indolizinium trifluoromethanesulfonate |
| 86 | 2,3-di(2,5-dimethoxy-4-n-propylphenyl)-7-[2-(1,2-dimethyl-1,2,3,4-tetrahydro-6-quinolinyl)-1-ethenyl]-1-oxo-1H-indolizinium trifluoromethanesulfonate |
| 87 | 2,3-diphenyl-6-methyl-7-[2-(1,2-dimethyl-1,2,3,4-tetrahydro-6-quinolinyl)-1-ethen- |

TABLE 1-continued

Dye No.

yl]-1-oxo-1H-indolizinium trifluoro-
methanesulfonate 88  2,3-diphenyl-8-methyl-7-[2-(1,2-dimethyl-
1,2,3,4-tetrahydro-6-quinolinyl)-1-ethen-
yl]-1-oxo-1H-indolizinium trifluoro-
methanesulfonate The described dyes are compatible with binders which are useful in making laser recording elements. By "compatible" is meant that the dye can be mixed with the binder in sufficient concentration to provide a high enough absorption factor to form pits without crystallizing after a layer of the dye and binder is coated and dry. That is, the layers are amorphous. Generally, the described dyes are compatible in dye-binder compositions comprising at least 50 percent dye by weight, although higher concentrations and therefore higher absorption factors are possible. Because of the high extinction coefficient of many of the present dyes at wavelengths from 750–900 nm and their excellent compatibility with common binders, these dyes can be included in the composition over a very wide range of concentration while maintaining the necessary absorption characteristics.

Useful binders include any film-forming material which is capable of being deformed upon exposure to high-energy density radiation such as a laser beam. Useful binders include cellulose acetate butyrate, polystyrenes, polysulfonamides, polycarbonates, cellulose nitrate, poly(ethyl methacrylate), poly(vinyl butyral) and the like. Combinations of binders can also be used. Cellulose nitrate is the preferred binder.

A useful laser recording element comprises a support having coated thereon a layer of the dye and the binder. Depending upon the desired mode of reading the element, the support is either reflective or transparent. In the case of a reflective support, both sides of the support can be reflective and a recording layer can be provided on both sides. The support can be any of a wide variety of materials including glass, a self-supporting polymer film such as poly(ethylene terephthalate) or cellulose acetate, or metal. The support must have a relatively high melting point in order to avoid deformation of the support during recording. The support is desirably very smooth to minimize noise and dropouts. In certain preferred embodiments, the support is coated with a smoothing layer prior to the coating of the reflective surface and the described dye-binder composition.

The composition which is used as a smoothing layer is preferably a low-viscosity, polymerizable fluid which can be coated on the surface of the support. Following coating, polymerization of the fluid produces a microsmooth surface on the support. The support can be made reflective by vacuum metalization of the smooth surface. In preferred embodiments, the polymerizable fluid comprises photopolymerizable monomers. Preferably, the monomers or mixtures of monomers are a low-viscosity fluids in the absence of a solvent. Useful polymerizable fluid compositions are described in U.S. Pat. Nos. 4,092,173 and 4,171,979.

The recording layer comprising the described dye and binder is coated by a wide variety of methods. Most conveniently, the dye and binder are coated from a common solvent or, alternatively, from a mixture of miscible solvents. The dye-binder composition can be coated by spray coating, air-knife coating, whirl coating or by any other suitable method. The thickness of the recording layer according to the present invention is not critical; however, best results are obtained when the thickness of the layer is between about 0.1 and about 10 microns.

The described recording compositions having an absorption factor of at least 20 are capable of producing depressions or holes surrounded by sharply defined ridges. This type of deformation can be read back using a read beam which is not significantly absorbed by the recording layer. By "sharply defined ridge" is meant that the ridge and hole/depression have noticeable boundaries and that, as measured in the plane of the undeformed outer surface of the layer, the width of the ridge is less than or equal to the breadth of the hole depression. These dimensions can be measured from an electron micrograph.

The thickness, absorption factor and index of refraction of the recording compositions of the present invention can be optimized by a method which is described in *Research Disclosure*, Item 20635, June 1981, published by Industrial Opportunities Ltd., Homewell, Havant, Hampshire, PO9, 1EF, UK.

The following examples are presented.

EXAMPLES 1–14

Dyes 71, 73, 74, 75, 76, 77, 78, 79, 80, 81, 83, 84, 87 and 88 were evaluated for utility in optical recording elements with a static pit tester.

The static pit tester provides automated facilities for exposing standard test patterns on 2" by 2" glass slides or film samples with a laser. A microcomputer using FORTH language was used to control the sample position and the laser power.

Fourteen different coating compositions were prepared by dissolving 0.060 gm dye, 0.060 gm cellulose nitrate in 10.0 gm of cyclohexanone.

Fourteen different coating compositions were prepared on glass slides or films by dip coating.

Each coating was then exposed, in the static pit tester, to a power series array of ten pits on 4 micron centers at each of six power levels (2, 3, 4, 6, 8 and 10 milliwatts) on the sample, with a 50 nanosecond pulse duration from an 830 nanometer diode laser. This pattern was repeated at 2 mm intervals across the sample for a total of thirteen test patches. These test patches were examined with a Nomarsky differential interference contrast microscope to determine the presence or absence of pits in a particular coating. A dye is considered useful when a pit is formed at any of the six power levels at any position of the coating.

Pits were formed in each of the fourteen coated compositions.

EXAMPLES 15–17

Recording elements were prepared with dyes 73, 75 and 71 (Table II) tested to Examples 1–14. The results of this test confirm the effectiveness of the static pit test in evaluating dyes for utility in optical recording elements.

Three different recording elements were prepared as follows:

110-mm-diameter circular glass substrates were whirl-coated with a surface-smoothing composition by flooding the glass substrates with the smoothing composition at low rpm (about 80–100 rpm) and then leveling the coatings by advancing the speed to about 500 rpm. The surface-smoothing composition comprised:

| | |
|---|---|
| pentaerythritol tetraacrylate | 20 g |
| a low-viscosity urethane-acrylate monomer (UV-curable Topcoat 874-C-2002 ®, Fuller O'Brien Corp.) | 20 g |
| 2-ethoxyethanol | 60 g |
| a coumarin sensitizer composition | 3 g |
| surfactant | 3 drops |

The coated and dried surface-smoothing composition was cured by irradiating with a 3000-watt pulsed xenon arc lamp at 18 inches for 4 minutes.

The thus smoothed surface of the substrates were then coated with a 500-Å-thick reflecting layer of aluminum by vapor deposition.

Three different recording layers were whirl-coated on the reflecting layers by flooding the reflecting layers with dye-binder-solvent coating solutions and then leveling the coatings at about 300 rpm for coatings 1 and 2, and 100 rpm for coating 3. The compositions of each coating solution is given in Table II.

TABLE II

| Element | Table I Dye No. | Binder | Solvent | Weight Ratio of Dye/Binder/Solvent | Coating rpm |
|---|---|---|---|---|---|
| 1 | 73 | cellulose nitrate | Cyclohexanone | 1/1/100 | 300 |
| 2 | 75 | cellulose nitrate | 2-Methoxyethanol | 1/1/60 | 300 |
| 3 | 71 | cellulose nitrate | Benzonitrile | 1/1/100 | 100 |

After drying, tracks were recorded in the recording layers of each element using a diode laser-light emitting at about 810 nm and focused with a numerical aperture $NA_g=0.525$ while the elements were rotating at 1800 rpm. The term "$NA_g$" represents the numerical aperture of the focused gaussian beam of light measured to its $e^{-2}$ irradience diameter. The diode laser was pulsed at 10 $MH_z$ and a 50% duty cycle in a 30 $KH_z$ bandwidth. The three dyes evaluated were:

1. 2,3-diphenyl-7-[2-(9-julolidyl)-1-ethenyl]-1-oxo-1H-indolizinium trifluoromethanesulfonate;
2. 2,3-bis(4-t-butylphenyl)-7-[2-(9-julolidyl)-1-ethenyl]-1-oxo-1H-indolizinium trifluoromethanesulfonate;
3. 1,2-bis(4-t-butylphenyl)-7-[4-(4-dimethylaminophenyl)-1-(1,3-butadienyl)]-3-3-oxo-3H-indolizinium trifluoromethanesulfonate.

The recorded tracks were then read back with the same laser. Incident write powers and the carrier-to-noise ratio on readout are given in Table III.

TABLE III

| Element | Table I Dye No. | Disc Rotational Speed (cps) | 1/1 Dye/Binder Absorption Factor | Recording Power at the Disc (mw) | Carrier-To-Noise Ratio (CNR) Readout (db) |
|---|---|---|---|---|---|
| 1 | 73 | 30 | 50 | 12 | 56 |
| 2 | 75 | 30 | 42 | 12 | 44 |
| 3 | 71 | 30 | 79 | 12 | 54 |

The invention has been described in detail with particular reference to preferred embodiments thereof, but it will be understood that variations and modifications can be effected within the spirit and scope of the invention.

What is claimed is:

1. An optical recording element comprising a support having coated thereon a layer of an amorphous composition (a) having an absorption factor of at least 20 and (b) comprising a binder and a dye selected from the group consisting of oxoindolizine and oxoindolizinium dyes.

2. The element of claim 1 wherein the layer absorbs in the 750–900 nm region of the spectrum and the oxoindolizine and oxoindolizinium dyes, in their keto form, have the structures:

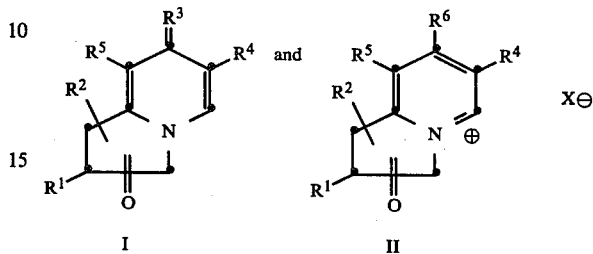

wherein $R^1$ and $R^2$ are individually selected from the group consisting of alkyl containing 1 to 18 carbon atoms; aryl containing 6 to 20 carbon atoms; and polystyryl having appended groups selected from the group consisting of indolizine and indolizinium groups and combinations thereof;

$R^3$ is a divalent group which, with structure I completes an organic chromophore;

$R^4$ and $R^5$ are individually hydrogen, chlorine, bromine, alkyl containing 1 to 18 carbon atoms; cyano; acyl containing 2 to 18 carbon atoms; carboalkoxy containing 1 to 18 carbon atoms; aminocarbonyl or acyloxy containing 2 to 18 carbon atoms;

$R^6$ is a monovalent group which with structure II completes an organic chromophore; and X is an anion.

3. The element of claim 1 wherein the dye is selected from the group consisting of:

2,3-diphenyl-7-[2-(9-julolidyl)-1-ethenyl]-1-oxo-1H-indolizinium trifluoromethanesulfonate;

2,3-di(2,4,6-trimethylphenyl)-7-[2-(9-julolidyl)-1-ethenyl]-1-oxo-1H-indolizinium trifluoromethanesulfonate;

2,3-di(4-tert-butylphenyl)-7-[2-(9-julolidyl)-1-ethenyl]-1-oxo-1H-indolizonium trifluoromethanesulfonate;

1,2-di-tert-butylphenyl-7-[4-(4-dimethylaminophenyl)-1-(1,3-butadienyl)]-3-oxo-3H-indolizinium trifluoromethanesulfonate;

2,3-di(2-methyl-5-isopropylphenyl)-7-[2-(9-julolidyl)-1-ethenyl]-1-oxo-1H-indolizinium trifluoromethanesulfonate;

2,3,-diphenyl-7-[2-(1,2-dimethyl-1,2,3,4-tetrahydro-6-quinolinyl)-1-ethenyl]-1-oxo-1H-indolizinium trifluoromethanesulfonate;

2,3-di(2,4,6-trimethylphenyl)-7-[2-(1,2,-dimethyl-1,2,3,4-tetrahydro-6-quinolinyl)-1-ethenyl]-1-oxo-1H-indolizonium trifluoromethanesulfonate;

2,3-diphenyl-7-(1-oxo-2-naphthylidene)-1-oxo-1H,7H-indolizine;

2,3-di(2,4,6-trimethylphenyl)-7-(1-oxo-2-naphthylidene-1-oxo-1H,7H-indolizine;

2,3-diphenyl-7-(1-oxo-4-methyl-2-naphthylidene)-1-oxo-1H,7H-indolizine;

2,3-di(2,5-dimethoxyphenyl)-6-methyl-7-[2-(1,2-dimethyl-1,2,3,4-tetrahydro-6-quinolinyl)-1-ethenyl]-1-oxo-1H-indolizinium trifluoromethanesulfonate;

2,3-di(2,5-dimethoxyphenyl)-8-methyl-7-[2-(1,2-dimethyl-1,2,3,4-tetrahydro-6-quinolinyl)-1-ethenyl]-1-oxo-1H-indolizinium trifluoromethanesulfonate;

2,3-diphenyl-6-methyl-7-[2-(1,2-dimethyl-1,2,-3,4-tetrahydro-6-quinolinyl)-1-ethenyl]-1-oxo-1H-indolizinium trifluoromethanesulfonate; and 2,3-diphenyl-8-methyl-7-[2-(1,2-dimethyl-1,2,-3,4-tetrahydro-6-quinolinyl)-1-ethenyl]-1-oxo-1H-indolizinium trifluoromethanesulfonate.

4. The recording element of claim 1 wherein said support is reflecting.

5. The recording element of claim 1 wherein said binder is cellulose nitrate.

* * * * *

UNITED STATES PATENT AND TRADEMARK OFFICE
CERTIFICATE OF CORRECTION

PATENT NO. : 4,446,223
DATED : May 1, 1984
INVENTOR(S) : Donald H. Wadsworth, Harold T. Thomas, George L. Fletcher and Charles H. Weidner Page 1 of 2

It is certified that error appears in the above-identified patent and that said Letters Patent are hereby corrected as shown below:

Col. 3, lines 1-11, the part reading

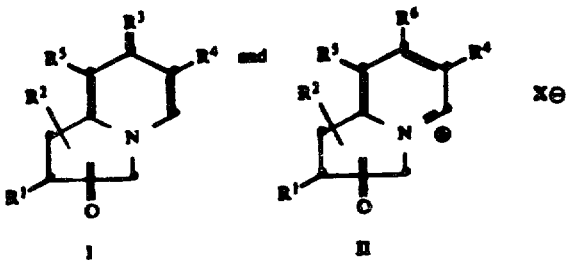

should read

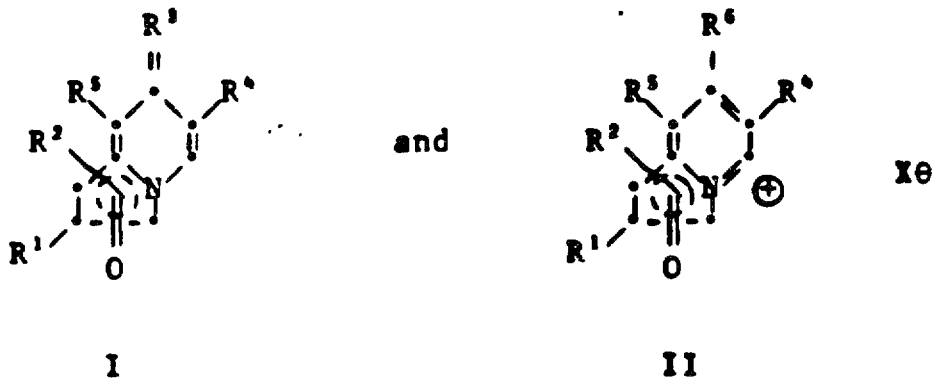

United States Patent and Trademark Office

CERTIFICATE OF CORRECTION

PATENT NO. : 4,446,223

DATED : May 1, 1984

INVENTOR(S) : Donald H. Wadsworth, Harold T. Thomas, George L. Fletcher and Charles H. Weidner It is certified that error appears in the above-identified patent and that said Letters Patent are hereby corrected as shown below Col. 12, lines 9-18, the part reading

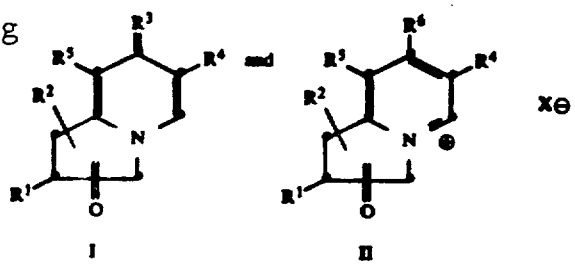

should read

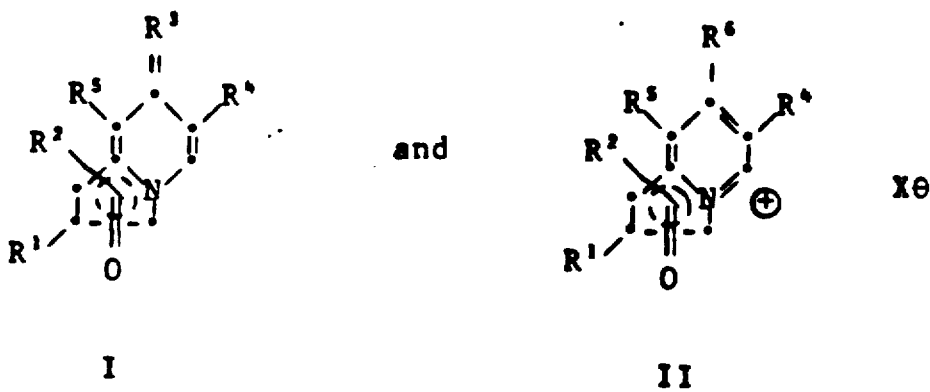

Signed and Sealed this

Twenty-third Day of October 1984

[SEAL]

Attest:

*Attesting Officer*

GERALD J. MOSSINGHOFF

*Commissioner of Patents and Trademarks*